United States Patent [19]

Polk

[11] Patent Number: 4,756,457
[45] Date of Patent: Jul. 12, 1988

[54] CARGO AND STORAGE APPARATUS FOR VANS AND LIKE VEHICLES

[76] Inventor: Lynn S. Polk, 978 N. Sycamore Ave., Rialto, Calif. 92376

[21] Appl. No.: 27,258

[22] Filed: Mar. 18, 1987

[51] Int. Cl.$^4$ .............................................. B60R 9/06
[52] U.S. Cl. ........................... 224/42.03 A; 224/42.08
[58] Field of Search ........ 224/273, 309, 310, 42.03 R, 224/42.03 A, 42.07, 42.08, 42.04, 42.15; 296/37.1, 37.6; 280/769

[56] References Cited

U.S. PATENT DOCUMENTS

| | | | |
|---|---|---|---|
| 2,136,157 | 11/1938 | Thomas | 296/37.1 X |
| 3,202,332 | 8/1965 | Walker | 224/42.08 X |
| 3,228,576 | 1/1966 | Gaukel | 224/42.03 A |
| 3,999,693 | 12/1976 | Cooper, Sr. | 224/42.03 A |
| 4,241,858 | 12/1980 | Lawroski | 224/42.03 R X |
| 4,282,994 | 8/1981 | Hilliard | 224/42.15 X |
| 4,288,011 | 9/1981 | Grossman | 280/769 X |
| 4,320,862 | 3/1982 | Bettenhausen | 224/42.03 A |
| 4,671,439 | 6/1987 | Gloeneweg | 224/42.03 A |

FOREIGN PATENT DOCUMENTS 2945274 5/1981 Fed. Rep. of Germany ... 224/42.03 R

Primary Examiner—Henry J. Recla
Assistant Examiner—Robert Petrik
Attorney, Agent, or Firm—Francis X. LoJacono

[57] ABSTRACT

A cargo and storage apparatus forming a closed, sealed container having two independently hinged storage receptacles adapted to be hingedly mounted on the rear exterior of a van-type vehicle to provide two sealed compartments useful for carrying items such as suitcases, bags, sports equipment, camping gear, tools, etc., each storage receptacle being independently hinged so that, when unlocked, it can be swung horizontally outward out of the way of the rear doors or lift gate of the vehicle, to provide access to each compartment as well as the interior of the vehicle, the hinges being mounted in the rear light recesses and the light fixtures of the vehicle being mounted in the respective storage containers. When in a closed, locked position and while traveling, the storage receptacles are held in alignment with each other and are supported by an alignment plate mounted on the rear bumper of the vehicle.

13 Claims, 3 Drawing Sheets

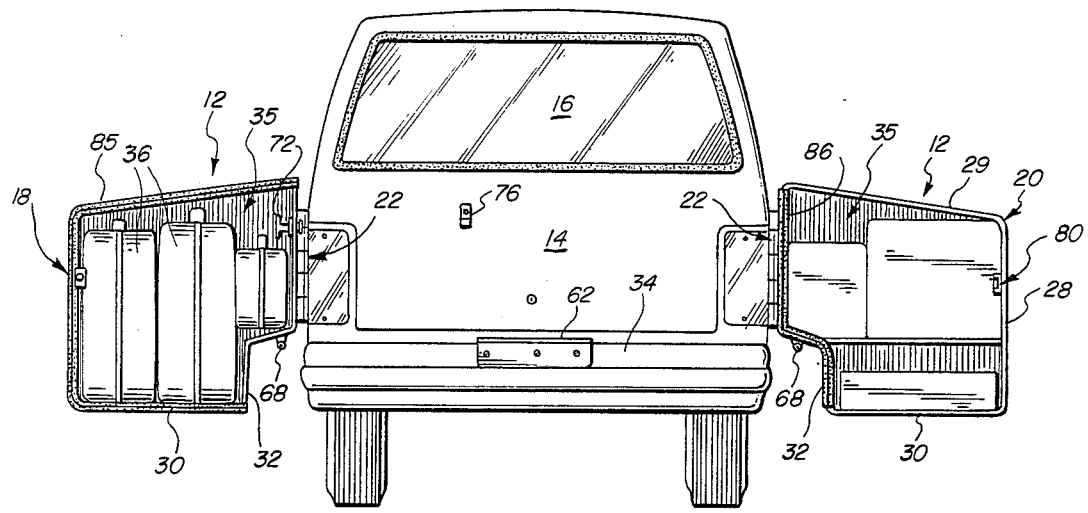
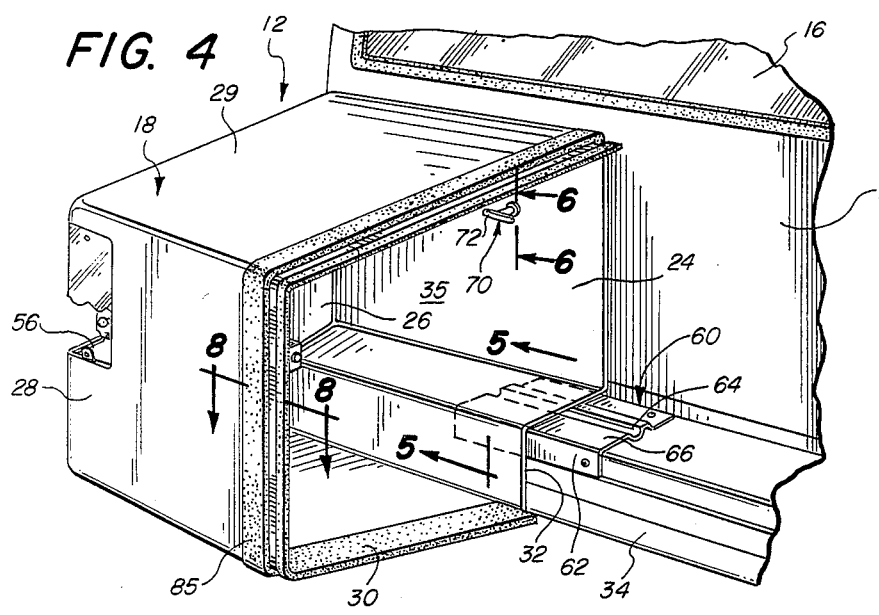
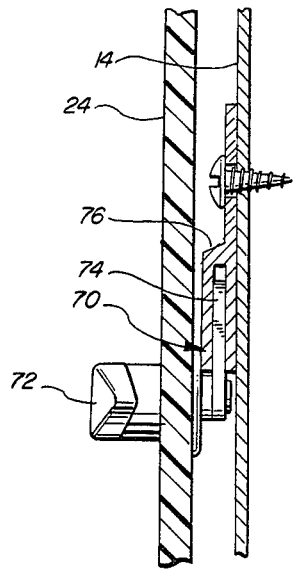
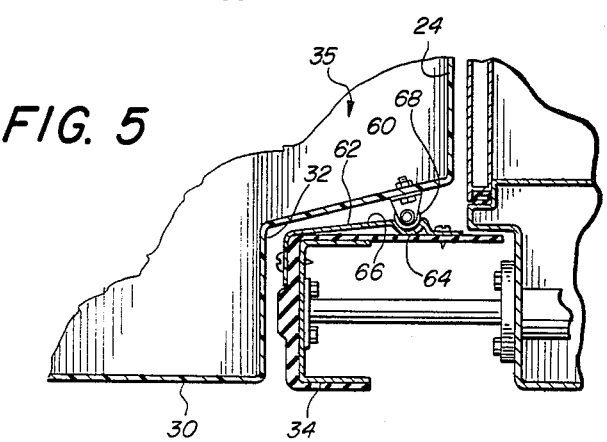

CARGO AND STORAGE APPARATUS FOR VANS AND LIKE VEHICLES

BACKGROUND OF THE INVENTION

This invention relates generally to a carrier accessory and more particularly to a cargo and storage apparatus for mounting to the rear exterior of a vehicle, especially a mini-van, so as to provide a novel and convenient enclosed container useful for carrying items such as suitcases, garment bags, sports equipment, tools, spare tires, fuel, etc.

Van-type vehicles now come in various sizes and shapes. Recently, there has been introduced into the market a vehicle referred to as a "mini-van". This type of small van has an inherent problem in that it often lacks sufficient space, particularly when used as a family vehicle or a recreational vehicle. It has been found that such compact interiors do not provide extra space for storing all the needed items including stoves, refrigerators, bedding and other paraphernalia. Such extra storage space, however, must provide ease of access to the stored items as well as ready access to the two types of conventional rear door structures employed by van manufacturers.

The two most common rear door arrangements are the use of two rear doors which are hinged at their outside edges and swing toward the center of the rear opening of the vehicle, and a one-piece lift gate which is hinged along the upper edge of the gate so that it opens upwardly above the vehicle roof line.

Accordingly, when located adjacent the rear doors, the additional storage container must allow for the respective door arrangements to be fully operable and accessible to the rear of the vehicle interior.

Various types of storage devices and carrier accessories have been tried and used. However, these devices have features that limit their use and restrict access to the rear of a vehicle.

One such device is disclosed in U.S. Pat. No. 4,241,858 issued to George Lawroski wherein the invention comprises a carrier accessory for vans that is so designed as to deliberately prevent access to the vehicle through the rear doors thereof. The container utilizes a bracket adaptable to vans which must be used in conjunction with the existing hinge brackets of the vehicle's rear doors with a supplemental support from a frame or bumper member.

In U.S. Pat. No. 4,320,862 issued to Merle M. Bettenhausen, there is disclosed an automobile rear baggage container which is removably mounted to the rear bumper of the automobile and includes a pair of forwardly extending straps securing the container to the rear wheel wells, with an additional strap extending from the bottom wall of the container and connected to the rear bumper. A pair of vertically extending walls and a generally horizontally extending wall are slidably mounted to the box and extend forwardly engaging by magnetic means the automobile rear surface to provide a streamlined configuration between the automobile and the container.

Other types of storage containers are disclosed in U.S. Pat. Nos. 3,762,758; 3,202,332; and 2,597,656.

OBJECTS AND SUMMARY OF THE PRESENT INVENTION

The present invention as disclosed herein defines generally a cargo and storage container having a pair of receptacles, each being separately hinged and mounted on the rear exterior of a vehicle, more particularly a van or mini-van type. When positioned in a closed mode, the receptacles define enclosed compartments which may be employed in several capacities for carrying and storing items such as suitcases, bags, and a large variety of equipment for camping, fishing, etc. A sink with fresh water, a waste-water holding tank, or a portable electric generator could also be installed in one of the respective compartments of the container. Moreover, the separately hinged container sections are so designed that, when unlocked, they can be swung out of the way to provide access to their contents and allow the vehicle's rear hinged doors or lift gate to be opened, thereby also providing access to the interior of the vehicle.

The receptacles are installed by removing the vehicle's two factory-equipped taillight assemblies. The factory-equipped taillights are then relocated in corresponding recesses provided in the receptacles. The container hinges are attached to the mounting hinge bases, and the taillights are reconnected to the vehicle's electric system.

The vehicle's license plate and its light are also relocated into the space provided in one of the receptacles, and the light is reconnected to the vehicle's electric system.

When in a closed, locked mode and while traveling, the receptacles are held in alignment with each other, and are also supported by an alignment plate mounted on the vehicle's rear bumper. There is further provided an all-weather sealing system interposed between the outer free edges of each section.

Thus, it is an important object of the present invention to provide a rearwardly disposed cargo and storage apparatus that is specifically designed for a van-type vehicle, particularly the type known as a "mini-van", whereby the rear doors or lift gates can still be readily available for rear access to the interior of the vehicle.

It is another object of the invention to provide a hinged storage container as disclosed herein having two separate receptacles hinged so as to be moved in a horizontal manner by means of the hinge, whereby the defined compartments become fully accessible.

Still another object of the invention is to provide an apparatus of this character that is mounted in such a manner as not to interfere with the rear windows of the rear door or lift gate.

It is still another object of the invention to provide an apparatus of this character that is easy to operate by an individual, and that includes relatively few operating parts.

It is still a further object of the invention to provide a device of this type that is easy to service maintain.

A further object of the invention is to provide a device of this character that is relatively inexpensive to manufacture and is simple yet rugged in construction.

The various features of novelty which characterize the invention are pointed out with particularity in the claims annexed to and forming a part of this disclosure. For a better understanding of the invention, its operating advantages by its use, reference should be had to the accompanying drawings and descriptive matter in which there is illustrated and described the preferred embodiment of the invention.

BRIEF DESCRIPTION OF THE DRAWINGS

Referring more particularly to the accompanying drawings, which are for illustrative purposes only, like reference numerals relate to respective parts thereof.

FIG. 3 is a rear-elevational view of the vehicle with the two sections of the container in an open accessible mode, showing items stored in the respective compartments of each container section;

FIG. 4 is a pictorial view of one container section in a closed position and supported on the vehicle bumper by means of an alignment plate;

FIG. 5 is an enlarged cross-sectional view of the alignment means taken substantially along line 5—5 of FIG. 4;

FIG. 6 is an enlarged cross-sectional view of the latch support lock taken along line 6—6 of FIG. 4;

DESCRIPTION OF THE PREFERRED EMBODIMENT

Figure 1:
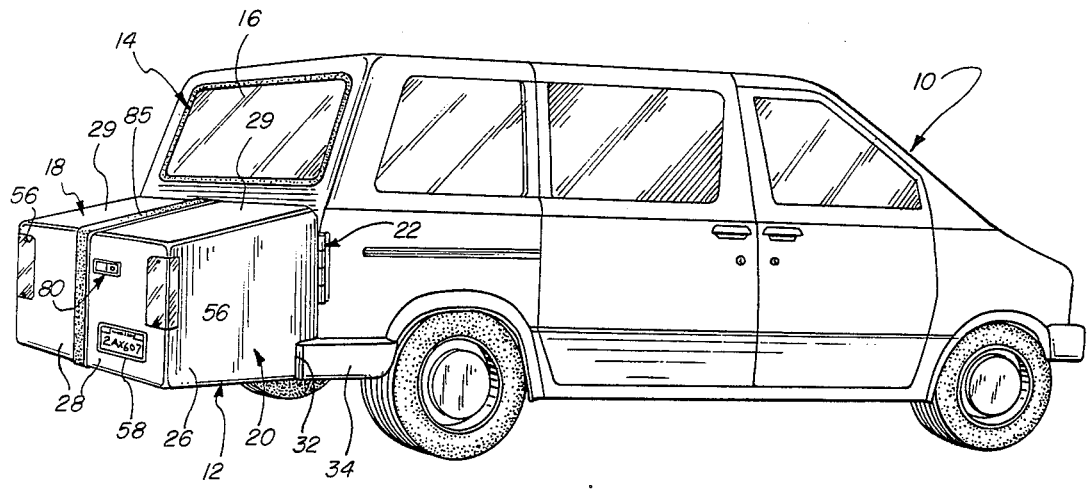
FIG. 1 is a pictorial view of a conventional type mini-van vehicle having the present invention hingedly mounted to the rear thereof, and wherein the pair of receptacles are illustrated in a closed, locked position.
Figure 2:
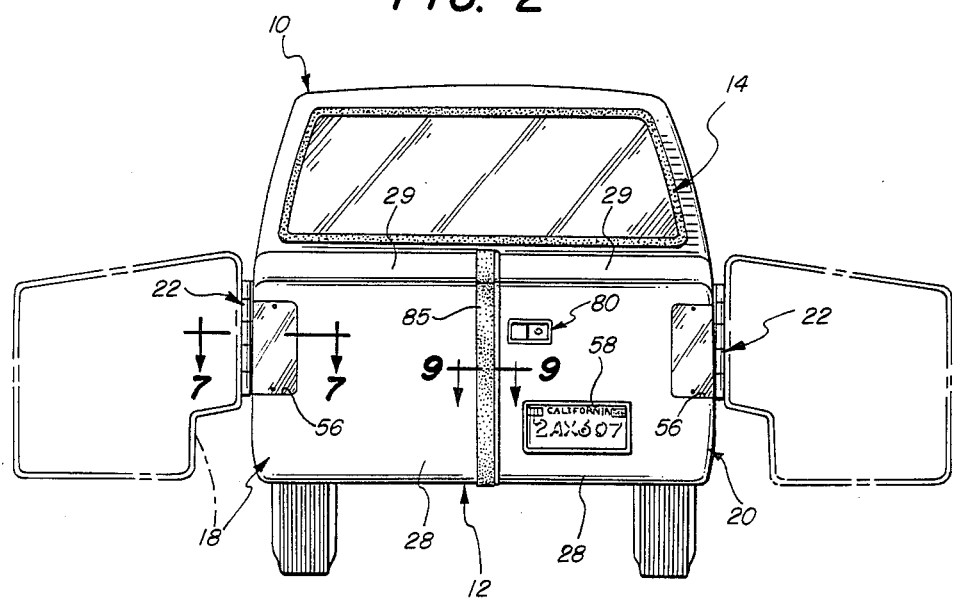
FIG. 2 is a rear-elevational view thereof, showing the sections of the storage container in an open position as indicated in phantom lines.

Referring more particularly to FIG. 1, there is shown a typical van-type vehicle, generally indicated at 10, wherein a cargo/storage container, generally designated at 12, is illustrated as being hingedly mounted to the rear of vehicle 10.

There are two common types of body styles particularly found in what are often called "mini-vans" because of their reduced size. One body style is shown herein, that being the one in which the rear opening of the van is provided with a lift-gate assembly 14 which is hinged at the upper edge of the rear opening. Accordingly, this lift-gate arrangement requires the lifting of the gate upwardly and outwardly. Another common rear access door arrangement includes two vertically positioned, side-hinged rear doors (not shown).

The cargo/storage container 12, hereinafter referred to as "container", is attached securely adjacent the outside of the rear gate or doors so as not to interfere with the rear window or windows 16. Container 12 comprises a pair of receptacles 18 and 20, respectively, which are each hingedly connected and supported by hinge means, designated at 22. Receptacles 18 and 20 are identical in their overall configuration; that is, they have a front wall 24, end wall 26, rear wall 28, top wall 29, and bottom wall 30 which includes a lateral recess 32 to accommodate the vehicle bumper 34, better seen in FIGS. 4 and 5.

Accordingly, each receptacle is preferably formed from a suitable plastic or fiberglass material. The wall structure of each receptacle, as described above, defines a storage compartment 35. The compartments as shown in FIG. 3 are capable of carrying and storing various items such as indicated by suitcases 36 stored in the compartment of the left receptacle 18 and boxes stored in the compartment of the right receptacle 20.

Figure 7:
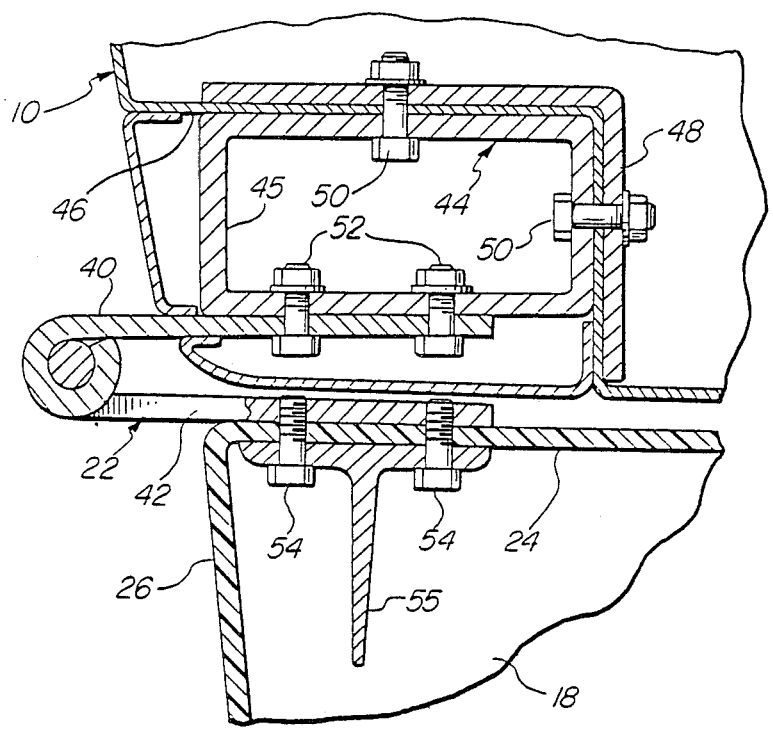
FIG. 7 is an enlarged cross-sectional view of a hinge device for the container section taken substantially along line 7—7 of FIG. 2.

As mentioned, each receptacle is individually hinged to the rear of the vehicle, the preferred hinging arrangement being illustrated in FIG. 7. Hinge means 20 comprises a hinge-mounting base 40 attached to vehicle 10, the receptacle hinge plate 42 being secured to front wall 24. It should be noted that both receptacles 18 and 20 are mounted in a similar manner, as described herein. To mount hinge-mounting base 40, each taillight assembly is removed from the vehicle and in place thereof a secondary superstructure is secured to the vehicle body. This secondary superstructure, generally indicated at 44, can be in any suitable form adapted for a particular vehicle, the superstructure herein shown comprising a box beam 45 located within taillight recess 46 and secured to an angle iron member 48 in a suitable manner, such as by means of bolts 50. Hinge base 40 is attached to beam 45 by bolts 52. Receptacle hinge plate 42 is mounted to front wall 24 by means of bolts 54 and a brace strut member 55. Such mounting arrangements for the receptacles allow each receptacle to be swung horizontally outward from the lift gate 14, as illustrated in FIG. 3, for ease of loading or unloading of the compartments.

After removing each taillight assembly from the vehicle, they are in turn installed in the respective light recesses 56 formed in the outer edges of receptacles 18 and 20, and then electrically connected back to the vehicle so as to operate operate in a conventional manner. It should be also noted that a recess 58 is formed in rear wall 28 of right receptacle 20 and adapted to receive a license plate therein.

To provide matching alignment between each receptacle when closing to form a sealed container, an alignment means, generally indicated at 60, is employed between bumper 34 and receptacles 18 and 20, this being clearly illustrated in FIG. 5. Alignment means 60 comprises an alignment striker plate 62 which is firmly secured to the central portion of bumper 34, plate 62 being formed with a transverse groove 64 and an inclined ramp member 66 which allows alignment strikers 68 to be readily engaged in striker plate 62, so as to guide strikers 68 into groove 64 when receptacles 18 and 20 are closed.

When closing the receptacles to define sealed compartments, the left receptacle 18 is positioned first in a closed mode, as illustrated in FIG. 4, and is then secured to the rear of vehicle 10 by a securing means, designated at 70. The securing means may be provided by any suitable locking device and is herein shown in FIG. 6 as comprising a lock handle 72 mounted to the front wall 24, the handle being located in compartment 35 which has a latch tongue member 74 positioned on the outer side thereof for locking engagement with keeper member 76 which is secured to lift gate 14.

Once receptacle 18 is secured in a closed/locked mode, receptacle 20 is then closed and locked into place by lock means 80 of suitable configuration. Preferably, a recessed pull-type handle unit is contemplated, this being well known in the art.

To provide an all-weather seal between the two receptacles, a rubber seal in the form of a pair of strips is mounted to the cooperating free edges of each receptacle. FIG. 4 illustrates an elongated sealing strip 85 mounted to the outer edge 82 of three sides of each receptacle. That is, sealing strip 85 extends along the edge of the bottom wall starting from receptacle recess 32, rearwardly around the edge of rear wall 28 and along top wall 29, ending at the top of front wall 24. A second shorter sealing strip 86 is mounted along the outer edge of front wall 24 of the opposite receptacle 5 extending downwardly, covering the edges of recesses 32 as seen in FIG. 3. The above sealing strip arrangement may be reversed, if necessary.

Figure 8:
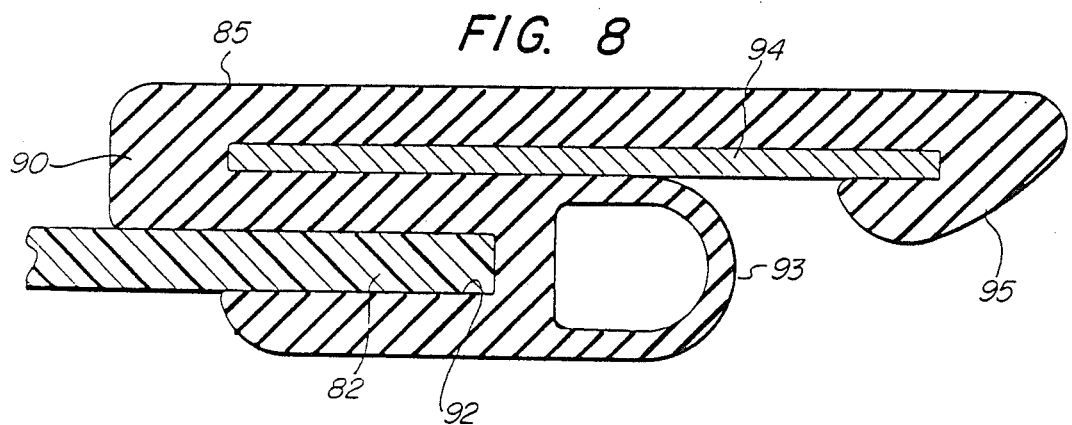
FIG. 8 is an enlarged cross-sectional view of the sealing strip attached to the edge of the container section taken along line 3—3 of FIG. 4.

FIG. 8 illustrates a sealing strip 85 attached to edge 82 and shows in a cross-sectional view the specific contemplated configuration thereof, wherein the unique sealing system consists of an extruded rubber strip having a body section 90 formed with a groove 92 to receive edge 82 of a receptacle wall, a bulb member 93 being positioned forwardly thereof. The body member is further formed so as to contain an elongated aluminum stiffener bar 94 which is also extended to project outwardly from bulb 93 to act as a stiffening means for sealing lip 95.

Figure 9:
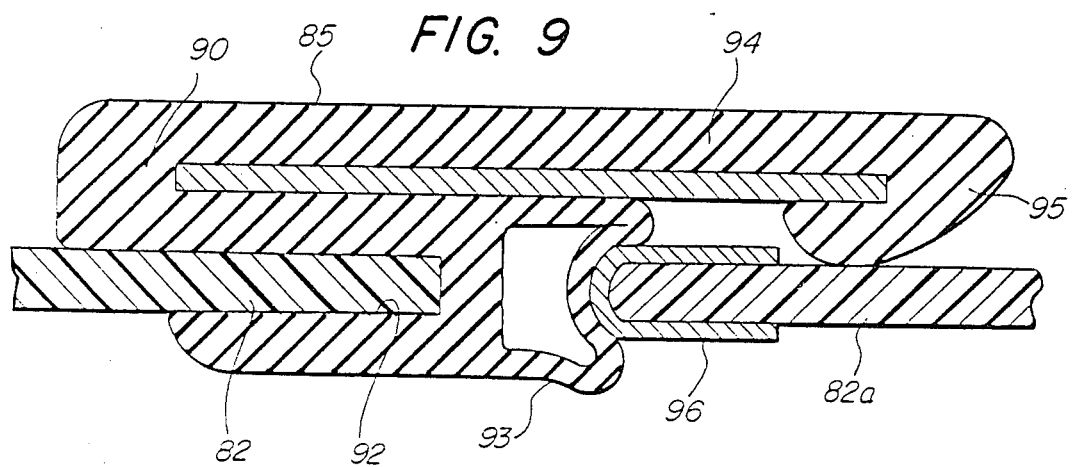
FIG. 9 is a cross-sectional view taken along line 9—9 of FIG. 2 wherein the container sections are in a closed position.

FIG. 9 shows the sealing engagement between the oppositely disposed receptacles wherein the engaging wall 82a includes an aluminum rim 96 positioned to engage bulb 93. As can be seen, wall 82a is sealed at two points along the sealing strip 86—that is, at the bulb and at the lip member 95.

The foregoing is a description of a preferred embodiment of the invention which is given here by way of example only. The invention is not to be taken as limited to any of the specific features as described, but comprehends all such variations thereof as come within the scope of the appended claims.

I claim:

1. A cargo and storage apparatus for vans and like vehicles having a rear door or gate and bumper, comprising:
    a container having a pair of receptacles, each of said receptacles including hinge means adapted to be mounted to the rear of said vehicle, whereby said receptacles pivot independently of each other in a horizontal plane;
    each of said receptacles defining a compartment having an open side to receive equipment therein for storage each open side of each receptacle defining a peripheral edge compliementally configured to each other so as to engage each other in sealed relation;
    an alignment means adapted to be mounted between said receptacles and the bumper of said vehicle, whereby said receptacles when pivoted toward each other are aligned with each such that said peripheral edges are in a closed, sealed position;
    securing means for securing one of said receptacles to the rear door or gate of said vehicle;
    lock means mounted on said receptacles for locking engagement between said receptacles when in a closed position; and
    sealing means positioned around one of said peripheral edges for sealing engagement between said peripheral edges of said receptacles.

2. An apparatus as recited in claim 1, wherein each of said receptacles includes a light recess, whereby the light assembly of said vehicle is transferred and mounted in said light recesses of said receptacles.

3. An apparatus as recited in claim 1, wherein said alignment means includes:
    an alignment striker plate having a transverse groove and an inclined ramp member, said alignment striker plate being centrally mounted to said bumper; and
    an alignment striker mounted to each of said receptacles, whereby said alignment striker engages said alignment striker plate and is received in said groove thereof.

4. An apparatus as recited in claim 2, wherein said securing means includes:
    a lock handle having a lock tongue operably mounted to one of said receptacle walls; and
    a keeper member fixedly secured to said rear door or gate of said vehicle, whereby said lock tongue engages said keeper to secure said receptacles in a closed horizontal position.

5. An apparatus as recited in claim 4, including hinge means comprising a hinge pivotally mounted between said rear of said vehicle and said receptacles, whereby said receptacles move independently of each other in a horizontal plane so as to provide access to the rear of said vehicle and allow said rear doors or gate to be opened without the need to remove said receptacles from said vehicle.

6. An apparatus as recited in claim 3, including a hinge means comprising:
    a pair of hinges, each being secured between said vehicle and each of said receptacles of said containers to allow each of said receptacles to form a sealed compartment when positioned in a closed, locked position and to be opened along a horizontal plane for ease of access to said compartments of each of said receptacles;
    each of said hinges including a hinge-mounting base secured to said vehicle; and
    a hinge plate secured to said receptacle, said hinge-mounting base being mounted within the rear light recess of said vehicle.

7. An apparatus as recited in claim 6, including a superstructure positioned within each of said rear light recesses of said vehicle, whereby said hinge base is attached thereto for structural support of said respective receptacle.

8. An apparatus as recited in claim 7, wherein each of said receptacles includes a transverse recess along the bottom front edge thereof, whereby said bumper of said vehicle is received therein to provide support of said receptacle when in a closed position.

9. An apparatus as recited in claim 8, wherein each of the receptacle walls includes a front wall, rear wall, bottom wall, top wall and rear wall, all of which are integrally formed to provide an open end defined by a continuous peripheral edge, said light recess being formed between said front and bottom walls.

10. An apparatus as recited in claim 9, wherein said sealing means comprises:
    a first sealing strip mounted to said edges of said top, rear and bottom walls of one of said receptacles; and
    a second sealing strip mounted to said edge of said front wall and the edge of said recess of the other said receptacle.

11. A storage device in combination with a vehicle, wherein the combination comprises:
    a van-type vehicle having a body including rear horizontally hinged doors, as well as a vertical lift gate and a bumper;
    a container having a first hinged section and a second hinged section adapted to be hingedly mounted to the rear side edges of said vehicle, whereby each section pivots horizontally outward from the center of said bumper;

each of said sections defining a compartment having open matching ends for access thereto said open ends defining matching peripheral edges;

means for aligning and supporting said hinged sections when said hinged sections are positioned in a sealed, closed position over said bumper;

means for securing at least one of said sections to the rear of said vehicle;

means for locking said sections together in a closed, sealed position; and sealing means mounted to said peripheral edges of each of said sections to provide an all-weather seal between said sections to define a sealed container.

12. A combination as recited in claim 11, wherein said means for aligning and supporting said sections include:
   an alignment striker plate having a transverse groove and an inclined ramp, said striker plate being centrally located and affixed to said bumper; and
   an alignment striker member secured to each of said sections, whereby said alignment striker is positioned to engage said ramp of said striker plate and is received in said groove thereof.

13. A combination as recited in claim 11, wherein said securing means comprises:
   a keeper member fixedly mounted to said door or gate of said vehicle;
   a latch handle operably mounted in one of said sections for securing engagement with said keeper member, whereby said section or sections are held in a securely closed position.

* * * * *